United States Patent
Asanuma et al.

(10) Patent No.: US 10,598,107 B2
(45) Date of Patent: Mar. 24, 2020

(54) EVAPORATED FUEL PROCESSING DEVICE

(71) Applicant: AISAN KOGYO KABUSHIKI KAISHA, Obu-shi (JP)

(72) Inventors: Daisaku Asanuma, Gamagori (JP); Nobuhiro Kato, Tokai (JP)

(73) Assignee: AISAN KOGYO KABUSHIKI KAISHA, Obu-Shi (JP)

( * ) Notice: Subject to any disclaimer, the term of this patent is extended or adjusted under 35 U.S.C. 154(b) by 49 days.

(21) Appl. No.: 16/088,275

(22) PCT Filed: Feb. 27, 2017

(86) PCT No.: PCT/JP2017/007386
§ 371 (c)(1),
(2) Date: Sep. 25, 2018

(87) PCT Pub. No.: WO2017/169420
PCT Pub. Date: Oct. 5, 2017

(65) Prior Publication Data
US 2019/0331036 A1  Oct. 31, 2019

(30) Foreign Application Priority Data
Mar. 30, 2016 (JP) .................. 2016-069339

(51) Int. Cl.
*F02D 41/00* (2006.01)
*F02M 25/08* (2006.01)

(52) U.S. Cl.
CPC ....... *F02D 41/003* (2013.01); *F02D 41/0045* (2013.01); *F02D 41/004* (2013.01); *F02M 25/089* (2013.01); *F02M 25/0872* (2013.01)

(58) Field of Classification Search
CPC .. F02D 19/029; F02D 19/0621; F02D 19/087; F02D 41/003; F02D 41/004; F02D 41/0045; F02M 25/0872; F02M 25/089
See application file for complete search history.

(56) References Cited

U.S. PATENT DOCUMENTS 6,732,718 B2  5/2004 Kano et al.
6,971,375 B2  12/2005 Amano et al.
(Continued)

FOREIGN PATENT DOCUMENTS

JP  H6-101534 A  4/1994
JP  2002-256986 A  9/2002
(Continued)

OTHER PUBLICATIONS

Written Opinion of the International Searching Authority of PCT International App. No. PCT/JP2017/007386 dated May 16, 2017 with English Translation (7 pages.).
(Continued)

*Primary Examiner* — Sizo B Vilakazi
*Assistant Examiner* — Anthony L Bacon
(74) *Attorney, Agent, or Firm* — Schmaker, Loop & Kendrick, LLP

(57) ABSTRACT

An evaporated fuel processing device including a pump sending a purge gas from a canister to an intake passage, a control valve switching between a communication state and a cutoff state where the canister and the intake passage are cut off on the purge passage, a return flow passage having one end connected to the purge passage between the pump and the control valve, and other end connected to an upstream side of the pump, wherein the purge gas flows from the one end to the other end in a case where the pump is activated in the cutoff state of the control valve, and a detecting device specifying an evaporated fuel concentration in the return flow passage during the cutoff state of the control valve in a case where the control valve is controlled based on the duty ratio and the pump is activated.

11 Claims, 11 Drawing Sheets

(56) References Cited

U.S. PATENT DOCUMENTS

| | | | |
|---|---|---|---|
| 7,219,660 B2 | 5/2007 | Amano et al. | |
| 7,383,826 B2 | 6/2008 | Kano et al. | |
| 2006/0144373 A1* | 7/2006 | Kano ................. | F02D 41/0045 123/519 |
| 2007/0137622 A1* | 6/2007 | Koyama ............ | F02D 41/0045 123/520 |
| 2007/0157907 A1* | 7/2007 | Takakura ........... | F02D 41/0045 123/494 |
| 2007/0251509 A1* | 11/2007 | Nakano .............. | F02D 41/0045 123/519 |
| 2008/0141983 A1* | 6/2008 | Takakura ............ | F02M 25/089 123/520 |
| 2015/0345411 A1* | 12/2015 | Ooiwa ................ | F02D 41/004 123/520 |
| 2017/0159588 A1* | 6/2017 | Honjo ............... | B01D 53/0446 |

FOREIGN PATENT DOCUMENTS

| | | |
|---|---|---|
| JP | 2006-161795 A | 6/2006 |
| JP | 2007-187011 A | 7/2007 |
| JP | 2007-285207 A | 11/2007 |
| JP | 2008-095564 A | 4/2008 |

OTHER PUBLICATIONS

International Search Report for PCT/JP2017/007386 dated May 16, 2017 (4 pages including English translation).

* cited by examiner

EVAPORATED FUEL PROCESSING DEVICE

TECHNICAL FIELD

The description herein discloses a technique related to an evaporated fuel processing device. Especially, it discloses an evaporated fuel processing device configured to purge evaporated fuel generated in a fuel tank to an intake passage and process the same.

BACKGROUND

JP H6-101534 A describes an evaporated fuel processing device. The evaporated fuel processing device includes a sensor for specifying a fluid density of air introduced into a canister and a sensor for specifying a fluid density of a purge gas sent from the canister to an engine. The sensor for specifying the fluid density of the purge gas is disposed between the canister and an intake passage leading to the engine. The evaporated fuel processing device uses the fluid density of the air and the fluid density of the purge gas specified respectively by the two sensors while purge is executed from the canister to the engine to calculate a concentration of the purge gas based on a ratio or a difference of these fluid densities.

SUMMARY

Technical Problem

When a sensor and the like is disposed on a passage (that is, a purge passage) leading to an engine (or an intake passage for supplying air to the engine) from a canister, this sensor may become a resistance (that is, ventilation resistance), and a supply quantity of a purge gas may thereby be limited. In order to sufficiently process evaporated fuel adsorbed by the canister, it is necessary to suppress the resistance in the purge passage. The description herein provides a technique that enables to specify a concentration of a purge gas while purge is being executed from a canister to an engine without disposing a device for specifying the concentration on a purge passage.

Solution to Problem

An evaporated fuel processing device disclosed herein may comprise a canister, a purge passage, a pump, a control valve, a controller, a return flow passage, and a detecting device. The canister may be configured to adsorb fuel evaporated in a fuel tank. The purge passage may be connected between the canister and an intake passage of an engine, and through which a purge gas sent from the canister to the intake passage passes. The pump may be disposed on the purge passage between the canister and the intake passage and configured to send the purge gas from the canister to the intake passage. The control valve may be disposed on the purge passage and configured to switch between a communication state and a cutoff state, the communication state being a state where the canister and the intake passage communicate through the purge passage, and the cutoff state being a state where the canister and the intake passage are cut off on the purge passage. The controller may be configured to control the communication state and the cutoff state of the control valve based on a duty ratio by switching the control valve between the communication state and the cutoff state in a case of supplying the purge gas from the canister to the intake passage. One end of the return flow passage may be connected to the purge passage between the pump and the control valve, and other end of the return flow passage may be connected to an upstream side of the pump, and the purge gas may flow from the one end to the other end in a case where the pump is activated in the cutoff state of the control valve. The detecting device may be configured to specify an evaporated fuel concentration of the purge gas in the return flow passage. The detecting device may specify the evaporated fuel concentration of the purge gas in the return flow passage during the cutoff state of the control valve in a case where the control valve is controlled based on the duty ratio and the pump is activated.

In this configuration, the purge gas is pumped by the pump in the case where the control valve is in the cutoff state, and the purge gas sent out from the canister flows in the return flow passage. The purge gas contains the evaporated fuel adsorbed by the canister. During when the control valve is controlled based on the duty ratio and the pump is activated, that is, during when a purge process for sending the purge gas from the canister to the intake passage is being executed, the purge gas is sent from the canister to the engine at a timing when the control valve is in the communication state, and is sent from the canister to the return flow passage at a timing when the control valve is in the cutoff state. As a result, the detecting device specifies the evaporated fuel concentration of the purge gas in the return flow passage at the timing when the control valve is in the cutoff state during the purge process, by which the evaporated fuel concentration of the purge gas that is currently being sent by the purge process may be specified. According to this configuration, the concentration of the purge gas may be specified during the purge process without disposing a detecting device on the purge passage.

The detecting device may be configured to specify the evaporated fuel concentration of the purge gas in the return flow passage during the cutoff state of the control valve and at a timing when the pump is activated for a first time after activation of the vehicle and when the control valve is controlled based on the duty ratio. According to this configuration, the concentration of the purge gas may be specified at an initial state when the purge process is started. Due to this, a fuel quantity that is supplied to the engine may be adjusted to an appropriate quantity at an early stage.

The detecting device may be configured to specify the evaporated fuel concentration of the purge gas in the return flow passage during the cutoff state of the control valve each time the pump is activated and the control valve is controlled based on the duty ratio. According to this configuration, the concentration of the purge gas may be specified each time the purge process is executed.

The vehicle may be configured to decide a correction value for feedback correction of a fuel injection quantity injected to the engine based on a detection result by a sensor specifying an air-fuel ratio in an exhaust passage through which an exhaust gas from the engine flows, while the control valve is controlled based on the duty ratio. The evaporated fuel processing device may further comprise a specifying device configured to specify the evaporated fuel concentration of the purge gas supplied from the purge passage to the intake passage based on the correction value. According to this configuration, the concentration of the purge gas does not have to be specified coinciding with a timing to close the control valve during when the purge process is being executed.

The vehicle may be configured to decide a correction value for feedback correction of a fuel injection quantity injected to the, engine based on a detection result by a sensor specifying an air-fuel ratio in an exhaust passage through which an exhaust gas from the engine flows, while the control valve is controlled based on the duty ratio after the timing when the pump is activated for the first time after activation of the vehicle and when the control valve is controlled based on the duty ratio. The evaporated fuel processing device in the present embodiment may further comprise a specifying device configured to specify the evaporated fuel concentration of the purge gas supplied from the purge passage to the intake passage based on the correction value. According to this configuration, the concentration of the purge gas does not have to be specified coinciding with the timing to close the control valve during when the purge process is being executed.

The controller may be configured to shift the control valve from a state where the control valve is controlled based on the duty ratio to the cutoff state in a case where the correction value exceeds a reference value while the control valve is controlled based on the duty ratio. The detecting device may be configured to specify the evaporated fuel concentration of the purge gas in the return flow passage in a case where the pump is activated after the control valve has shifted to the cutoff state. For example, in a case where the evaporated fuel is generated abruptly in, the fuel tank such as in a case where the vehicle shakes at a great magnitude or the like, and the purge concentration may become high. According to this configuration, a situation where the fuel quantity sent to the engine by the purge process becomes large and an appropriate air-fuel ratio cannot be maintained in the engine may be avoided. Further, by specifying the purge concentration using the detecting device after having shifted the control valve to the cutoff state, a more accurate concentration can be specified.

The controller may be configured to elongate an activation cycle of the control valve in a case where the detecting device is to specify the evaporated fuel concentration. According to this configuration, by elongating the cycle to switch between the communication state and the cutoff state without changing the duty ratio, a period during which the control valve is in the cutoff state may be elongated in each cycle. Due to this, a situation where the purge gas does not circulate sufficiently in the return flow passage and the appropriate concentration of the purge gas cannot be specified may be suppressed.

The detecting device may be configured to specify the evaporated fuel concentration of the purge gas in the return flow passage during when the activation cycle is elongated and the control valve is in the cutoff state. According to this configuration, a period during which the detecting device may specify the concentration can be elongated.

The controller may be configured to limit the duty ratio to a reference duty ratio or lower in a case where the detecting device is to specify the evaporated fuel concentration. According to this configuration, a situation where the control valve is maintained in the communication state during when it is controlled based on the duty ratio can be avoided.

The detecting device may be configured to specify the evaporated fuel concentration by using a detection result obtained after a period in which the control valve is in the cutoff state exceeds a predetermined reference period or a stable detection result detected during the cutoff state of the control valve. Immediately after the control valve is switched to the cutoff state, a purge gas flow rate in the return flow passage is not stabilized. Due to this, the purge concentration obtained from the detection result of the detecting device is also not stable. According to this configuration, the stable purge concentration may be specified.

The detecting device may be configured to specify the evaporated fuel concentration by using one of a maximum detection result and a minimum detection result that is obtained later than the other, the maximum detection result and the minimum detection result being detected during the cutoff state of the control valve. According to this configuration, the purge concentration may be specified appropriately.

DESCRIPTION OF EMBODIMENTS

First Embodiment

Figure 1:
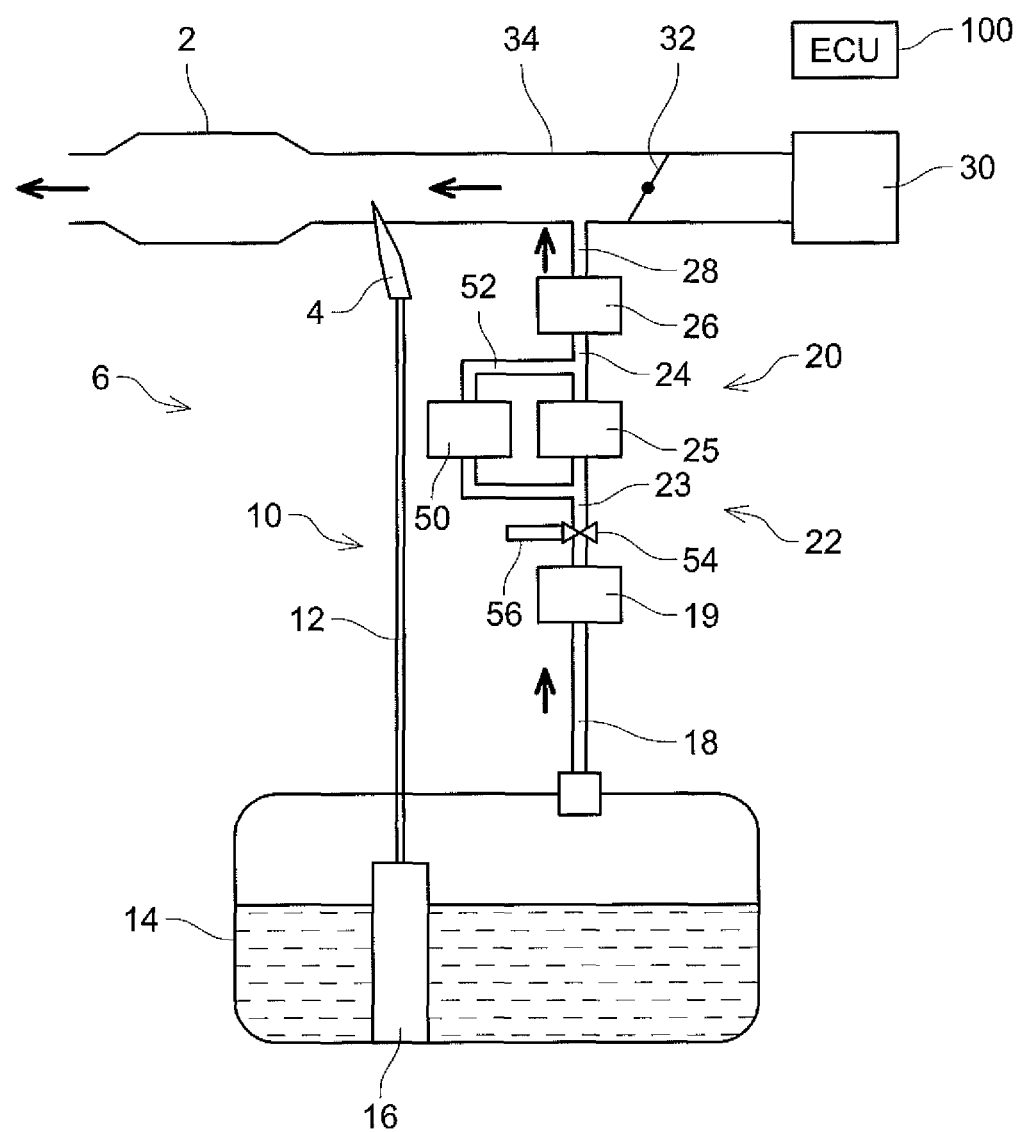
FIG. 1 shows an overview of a fuel supply system of a vehicle according to an embodiment.

A fuel supply system 6 provided with an evaporated fuel processing device 20 will be described with reference to FIG. 1. The fuel supply system 6 is mounted on a vehicle having an engine 2, such as a vehicle that runs on gas or a hybrid vehicle. The fuel supply system 6 is provided with a main supply passage 10 for supplying fuel stored in a fuel tank 14 to the engine 2 and a purge passage 22 for supplying evaporated fuel generated in the fuel tank 14 to the engine 2.

The main supply passage 10 is provided with a fuel pump unit 16, a supply passage 12, and an injector 4. The fuel pump unit 16 is provided with a fuel pump, a pressure regulator, a control circuit, and the like. The fuel pump unit 16 controls the fuel pump according to a signal supplied from an ECU (abbreviation of Engine Control Unit) 100. The fuel pump boosts pressure of the fuel in the fuel tank 14 and discharges the same. The pressure of the fuel discharged from the fuel pump is regulated by the pressure regulator, and the fuel is supplied from the fuel pump unit 16 to the supply passage 12. The supply passage 12 is connected to the fuel pump unit 16 and the injector 4. The fuel supplied to the supply passage 12 passes through the supply passage 12 and reaches the injector 4. The injector 4 includes a valve (not shown) of which aperture (that is, a fuel injected time period) is controlled by the ECU 100. When the valve of the injector 4 is opened, the fuel in the supply passage 12 is supplied to an intake passage 34 connected to the engine 2.

The intake passage 34 is connected to an air cleaner 30. The air cleaner 30 is provided with a filter that removes foreign particles in air that flows into the intake passage 34. A throttle valve 32 is provided in the intake passage 34. When the throttle valve 32 opens, air is suctioned from the air cleaner 30 toward the engine 2. The throttle valve 32 adjusts an aperture of the intake passage 34 and adjusts a quantity of air flowing into the engine 2. The throttle valve 32 is provided on an upstream side (air cleaner 30 side) than the injector 4.

The evaporated fuel processing device 20 is disposed on the purge passage 22. The evaporated fuel processing device 20 is provided with a canister 19, a pump 25, a control valve 26, a return flow passage 52, a concentration sensor 50, an air communicating valve 54, and an air communicating passage 56. The fuel tank 14 and the canister 19 are connected by a communicating passage 18. The canister 19 and the pump 25 are connected by a communicating passage 23. The pump 25 and the control valve 26 are connected by a communicating passage 24. The control valve 26 and the intake passage 34 are connected by a communicating passage 28. The communicating passage 28 is connected to the intake passage 34 between the injector 4 and the throttle valve 32.

The canister 19 adsorbs evaporated fuel generated in the fuel tank 3. The canister 19 is provided with a purge port, an air port, and a tank port. The tank port is connected to the communicating passage 18. The purge port is connected to the communicating passage 23. The canister 19 accommodates activated charcoal with which the evaporated fuel can be adsorbed. The activated charcoal adsorbs the evaporated fuel from gas that flows into the canister 19 from the fuel tank 14 through the communicating passage 18. The gas after the evaporated fuel has been absorbed therefrom is discharged to open air by flowing through the air port. The canister 19 can prevent the evaporated fuel in the fuel tank 14 from being discharged to the open air.

The pump 25 is disposed between the canister 19 and the control valve 26, and pumps air containing the evaporated fuel (hereinbelow termed "purge gas") to the communicating passage 24. The pump 25 is controlled by the ECU 100. In a case where the engine 2 is driving, the intake passage 34 is in a negative pressure. Due to this, the evaporated fuel adsorbed in the canister 19 can be introduced into the intake passage 34 by a pressure difference between the intake passage 34 and the canister 19. However, since the evaporated fuel processing device 20 is provided with the pump 25, the evaporated fuel adsorbed in the canister 19 can be supplied to the intake passage 34 even in a case where the negative pressure generated by the engine 2 is small.

The control valve 26 is a solenoid valve controlled by the ECU 100. More specifically, the control valve 26 is switched between an open state and a closed state by power according to a duty ratio decided by the ECU 100 being supplied thereto (that is, by being controlled on duty basis). A communication state in which the canister 19 and the intake passage 34 are communicated via the purge passage 22 by the control valve 26 being opened and a cutoff state in which the canister 19 and the intake passage 34 are cut off in the purge passage 22 by the control valve 26 being closed are switched. When the control valve 26 is controlled on the duty basis, the control valve 26 repeats to be in the cutoff state and the communication state cyclically. This state is called a purge state. That is, in the purge state, the state in which the canister 19 and the intake passage 34 are communicated does not continue, but the states in which the canister 19 and the intake passage 34 are communicated by the control valve 26 being opened and the canister 19 and the intake passage 34 are cut off by the control valve 26 being closed are switched cyclically. Due to this, a supply quantity of the purge gas is controlled. In the duty-based control, a known method is used by the ECU 100 to decide the duty ratio based on a purge concentration, a purge gas flow rate, and an air-fuel ratio of the engine 2.

An upstream end of the return flow passage 52 is connected to the communicating passage 24 between the pump 25 and the control valve 26. A downstream end of the return flow passage 52 is communicated with the communicating passage 23 between the canister 19 and the pump 25. As a result, in a case where the control valve 26 is closed and the pump 25 is driving, the purge gas flows from the communicating passage 24 into the return flow passage 52, and further flows to the communicating passage 23.

Figure 2:
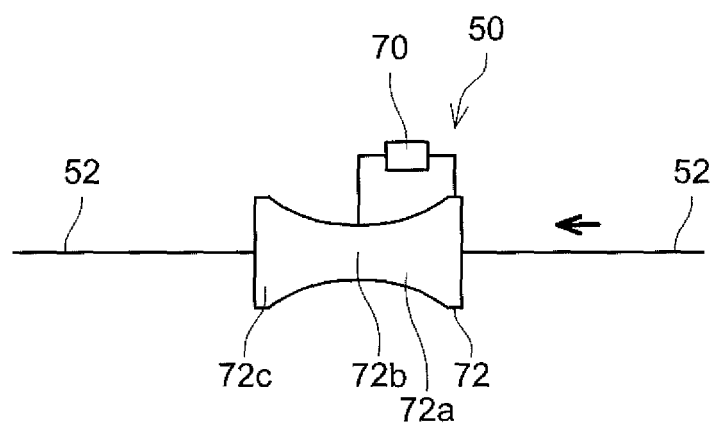
FIG. 2 shows a configuration of a concentration sensor according to the embodiment.

The concentration sensor 50 is disposed at an intermediate position on the return flow passage 52. On the other hand, no concentration sensor is disposed on the purge passage 22. As shown in FIG. 2, the concentration sensor 50 is provided with a venturi passage 72 and a differential pressure sensor 70. One end 72a of the venturi passage 72 is connected to an upstream side of the return flow passage 52. Another end 72c of the venturi passage 72 is connected to a downstream side of the return flow passage 52. The differential pressure sensor 70 is connected between the end 72a and a center portion (throttling portion) 72b of the venturi passage 72. The concentration sensor 50 uses the differential pressure sensor 70 capable of specifying a pressure difference between the end 72a and the center portion 72b to specify the pressure difference between the end 72a and the center portion 72b. By specifying the pressure difference between the end 72a and the center portion 72b, a density of the purge gas (purge concentration) can be calculated (that is, specified) by a Bernoulli formula.

Various types of sensors may be used in the concentration sensor 50. For example, the differential pressure sensor 70 may be provided with an orifice passage provided with an orifice plate instead of the venturi passage 72. The concentration sensor 50 may specify a pressure difference between upstream and downstream sides of the orifice plate using the differential pressure sensor 70 to specify the purge gas concentration. Alternatively, for example, the differential pressure sensor 70 may be provided with a capillary passage viscometer instead of the venturi passage 72. The capillary passage viscometer may have a plurality of capillary passages disposed therein. A pressure difference between upstream and downstream sides of the capillary passages may be specified by using the differential pressure sensor 70, and viscosity of the purge gas passing through the capillary passage viscometer may be measured. Due to this, the viscosity of the purge gas can be calculated by a Hagen-Poiseuille formula. The viscosity of the purge gas has a correlated relationship with the concentration of the purge gas, so the concentration of the purge gas can be specified by calculating the viscosity of the purge gas.

Further, the concentration sensor 50 may have a pressure sensor that specifies a pressure on upstream or downstream side of the venturi passage 72 instead of the differential pressure sensor 70.

The air communicating passage 56 is connected to the communicating passage 23 between the canister 19 and the pump 25 via the air communicating valve 54. One end of the air communicating passage 56 is connected to the air communicating valve 54, and another end is opened to air. The air communicating valve 54 is a three-way valve. The air communicating valve 54 is controlled by the ECU 100, and the pump 25 is switched to one of a state in which it communicates with open air through the communicating passage 23 and the air communicating passage 56 and a state in which it communicates with the canister 19 through the communicating passage 23.

The ECU 100 includes a CPU and a memory such as a ROM and a RAM. The ECU 100 is connected to the injector 4, the evaporated fuel processing device 20, the throttle valve 32, and the like and controls the same. The memory of the ECU 100 stores in advance values and data maps necessary for processing in the evaporated fuel processing device 20, such as a feedback correction coefficient calculation process (see FIG. 3) and a specifying process (see FIGS. 4 and 5) to be described later. Specifically, details will be described in descriptions regarding the respective processes later.

Next, an operation of the evaporated fuel processing device 20 will be described. When a purge condition is satisfied while the engine 2 is driving, the ECU 100 executes the purge process by controlling the control valve 26 on the duty basis. The purge condition is a condition that is satisfied in a case where the purge process to supply the purge gas to the engine 2 should be executed, and is a condition that is set to the ECU 100 in advance by a manufacturer according to a cooling water temperature for the engine 2 and a situation of the concentration specified by the concentration sensor 50. The ECU 100 is monitoring whether the purge condition is satisfied at all times during when the engine 2 is driving. The ECU 100 controls the output of the pump 25 and the duty ratio of the control valve 26 based on the concentration of the purge gas specified by the concentration sensor 50. When the pump 25 is activated, the purge gas that has been adsorbed in the canister 19 and the air having passed the air cleaner 30 are introduced to the engine 2.

The ECU 100 controls an aperture of the throttle valve 32. Further, the ECU 100 also controls the injected fuel quantity by the injector 4. Specifically, it controls the injected fuel quantity by controlling an opened time period of the injector 4. When the engine 2 is driven, the ECU 100 calculates a fuel injection time period per unit time period for injection from the injector 4 to the engine 2 (that is, the opened time period of the injector 4). The fuel injection time period is calculated by correcting a reference injection time period that was specified in advance by experiments by using a feedback correction coefficient to maintain the air-fuel ratio at a target air-fuel ratio (for example, an ideal air-fuel ratio). The fuel injection time period may be corrected by using another coefficient (such as a warm-up increasing coefficient and an acceleration increasing coefficient) in addition to the feedback correction coefficient. The feedback correction coefficient is a coefficient for controlling the air-fuel ratio to the target air-fuel ratio based on a detection result of an air-fuel ratio sensor. The air-fuel ratio sensor is disposed in the exhaust passage of the engine 2.

Figure 3:
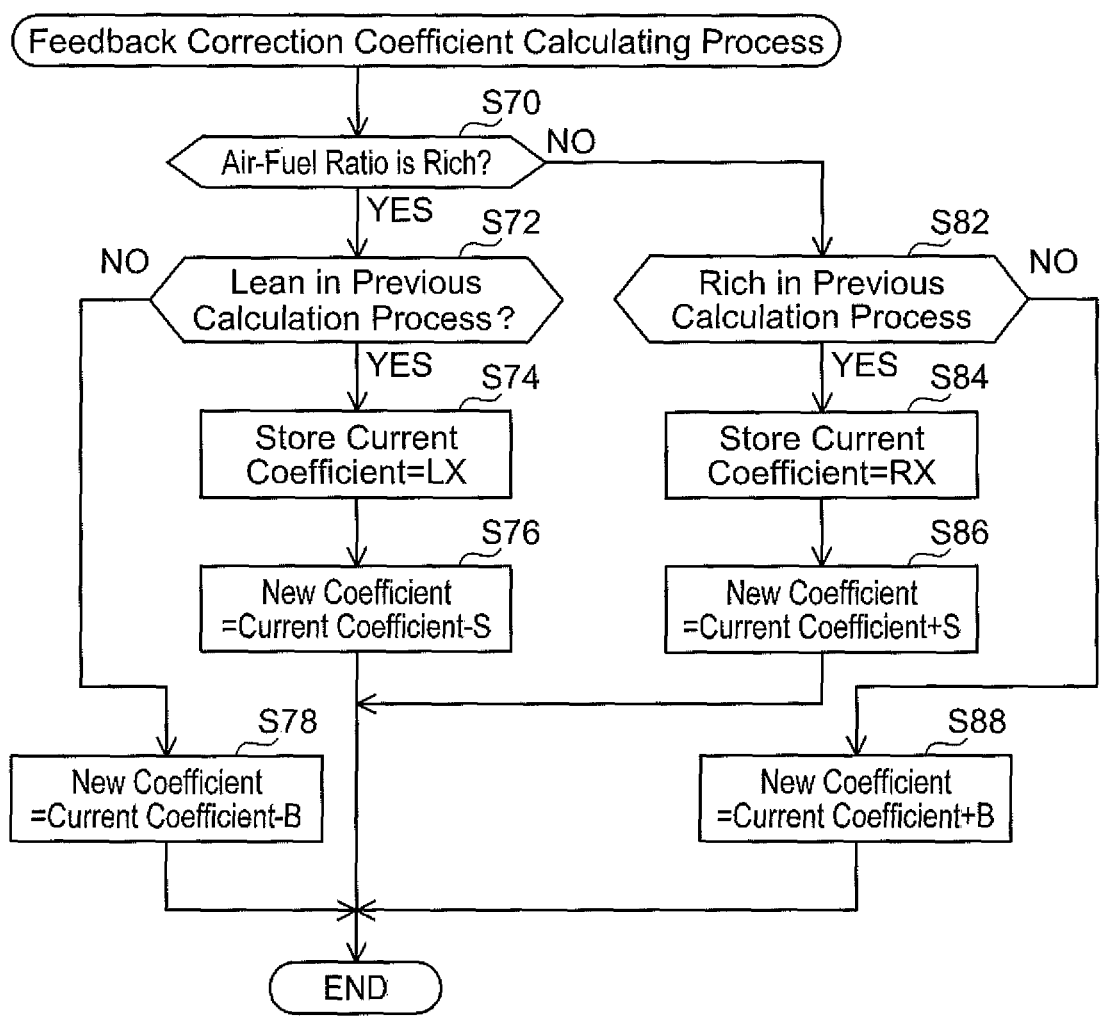
FIG. 3 shows a flowchart of a feedback correction coefficient calculation process according to the embodiment.

A calculation process of the feedback correction coefficient which the ECU 100 executes will be described with reference to FIG. 3. The calculation process is executed periodically and repeatedly after the engine 2 is activated. The ECU 100 firstly determines in S70 whether the detection result of the air-fuel ratio sensor is rich or not. A determination result is stored in the ECU 100. In a case of determining as being rich (YES in S70), the ECU 100 determines in S72 whether a determination of being lean was made in S70 in a previous calculation process or not. That is, in S72, a determination is made on whether a ratio state thereof has changed from lean to rich or not. In a case where the determination from S70 in the previous calculation process is not stored in the ECU 100, YES is determined in S72.

In a case of determining that the ratio state has changed from lean to rich (YES in S72), the ECU 100 stores a current feedback correction coefficient (that is, the feedback correction coefficient that was calculated in the case where the ratio state was lean in the previous calculation process) as a lean-side coefficient LX in the ECU 100 in S74. Then, in S76, the ECU 100 calculates a new feedback correction coefficient by subtracting a preset skip value S from the current feedback correction coefficient. The current feedback correction coefficient is a value that was calculated in the case where the ratio state was lean in the previous calculation process, and is greater than the feedback correction coefficient=1.0 for a case of the target air-fuel ratio. Due to this, in a situation of determining that the ratio state is rich (YES in S70), the fuel injection quantity is reduced by setting the feedback correction coefficient smaller. The calculation process is terminated when S76 is completed.

On the other hand, in S72, in a case where the ratio state was determined as being rich in the previous calculation process of S70 (NO in S72), that is, in a case where a rich state is continuing, the ECU 100 skips S74 and S76, and subtracts a predetermined value B from the current feedback correction coefficient in S78. The predetermined value B is sufficiently smaller than the skip value S. That is, in the case where the rich state is continuing, the feedback correction coefficient is gradually made smaller to reduce the fuel injection quantity. The calculation process is terminated when S78 is completed. The skip value S and the predetermined value B are specified in advance by experiments and are stored in the ECU 100.

In a case of determining that the ratio state is lean (NO in S70) in S70, the ECU 100 determines in S82 whether a determination of being rich was made in S70 in the previous calculation process or not. That is, in S82, a determination is made on whether the ratio state has changed from rich to lean between the previous calculation process and the current calculation process. In a case of determining that the ratio state has changed from rich to lean (YES in S82), the ECU 100 stores the current feedback correction coefficient (that is, the feedback correction coefficient that was calculated in the case where the ratio state was rich in the previous calculation process) as the lean-side coefficient RX in the ECU 100 in S84. Then, in S86, the ECU 100 adds the preset skip value S to the current feedback correction coefficient. The current feedback correction coefficient is a value that was calculated in the case where the ratio state was rich in the previous calculation process, and is smaller than 1.0. Due to this, in a situation of determining that the ratio state is lean (NO in S70), the fuel injection quantity is increased by setting the feedback correction coefficient larger. The calculation process is terminated when S86 is completed.

On the other hand, in a case where the ratio state was determined in S82 as being lean in S70 of the previous calculation process (NO in S82), that is, in a case where a lean state is continuing, the ECU 100 skips S84 and S86, and adds the predetermined value B to the current feedback correction coefficient in S88. That is, in the case where the lean state is continuing, the feedback correction coefficient is gradually made larger to increase the fuel injection quantity. The calculation process is terminated when S88 is completed.

Under a situation where the purge process is not executed, the feedback correction coefficient varies around 1.0. The feedback correction coefficient is varied slowly by using a relatively small value K under a situation where the ratio state is maintained rich or lean.

The air-fuel ratio of the engine 2 varies according to an evaporated fuel quantity supplied by the purge process. The evaporated fuel processing device 20 decides the duty ratio during the purge process based on the purge concentration. Thus, by suitably specifying the purge concentration, the evaporated fuel processing device 20 can supply the purge gas at a suitable quantity to the engine 2.

In the evaporated fuel processing device 20, an initial specifying process in which the purge concentration is specified during the purge process executed for a first time since the vehicle was activated is different from a normal specifying process in which the purge concentration is specified during the second and subsequent purge processes. Further, a stop-state specifying process in which the purge concentration is specified during when the purge process is not executed is different from the initial specifying process and the normal specifying process.

The specifying process will be described with reference to FIGS. 4 to 6. The specifying process is started when the vehicle is activated. During when the vehicle is operating, they are periodically executed. Here, the activation of the vehicle means, in a case where a driving source of the vehicle is only the engine 2, that an ignition switch is operated by a driver, and the engine 2 is thereby started. On the other hand, in a case where the driving source of the vehicle includes the engine 2 and a motor, that is, in a case where the vehicle is a hybrid vehicle, it means that a start switch of the vehicle is operated by the driver and a control system of the vehicle is initiated.

Figure 6:
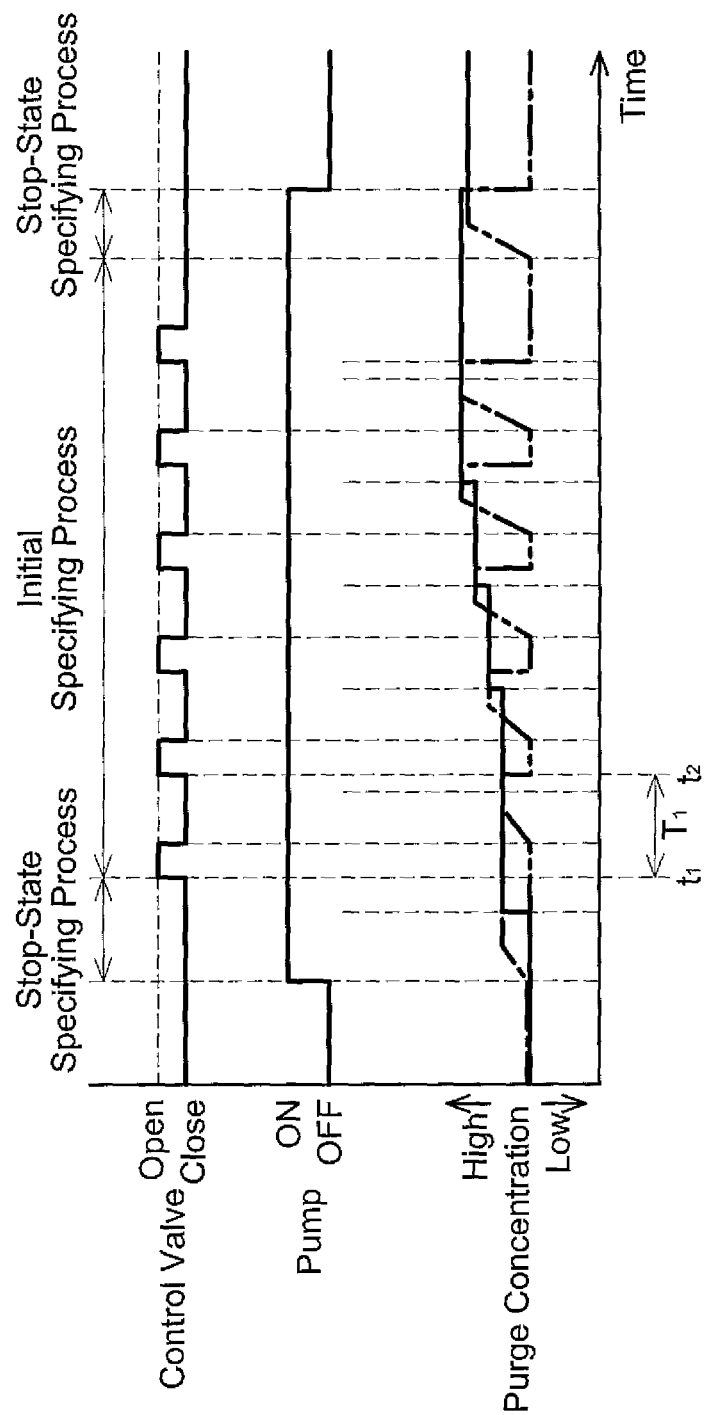
FIG. 6 shows a time chart indicating changes in opening and closing of a control valve and a purge concentration according to the first embodiment.

FIG. 6 is a time chart showing control of the control valve 26 and changes in the specified concentration during periods of the stop-state specifying process taking place since the vehicle is activated until the initial specifying process is executed, the initial specifying process, and the stop-state specifying process after the initial specifying process is executed. An upper portion of FIG. 6 indicates switching timings of the control valve 26 between the opened state and the closed state. A middle portion of FIG. 6 indicates switching timings of the pump 25 between ON (that is, driving) and OFF (that is, stopped). A lower portion of FIG. 6 indicates the purge concentration. The purge concentration indicated by a one-dot chain line is the purge concentration that can be achieved by using the concentration sensor 50, and the purge concentration indicated by a solid line is the purge concentration that is specified as the purge concentration in the specifying process and stored in the ECU 100. The ECU 100 uses the purge concentration specified as the purge concentration to execute the control of the processing device 20 and the control of the fuel injection quantity.

At a timing when the vehicle is activated, respective flags to be described later are not set, the pump is stopped, the concentration is not stored in the ECU 100, the control valve 26 is closed, and the air communicating valve 54 is maintained in the state of communicating the pump 25 with the canister 19.

Figure 4:
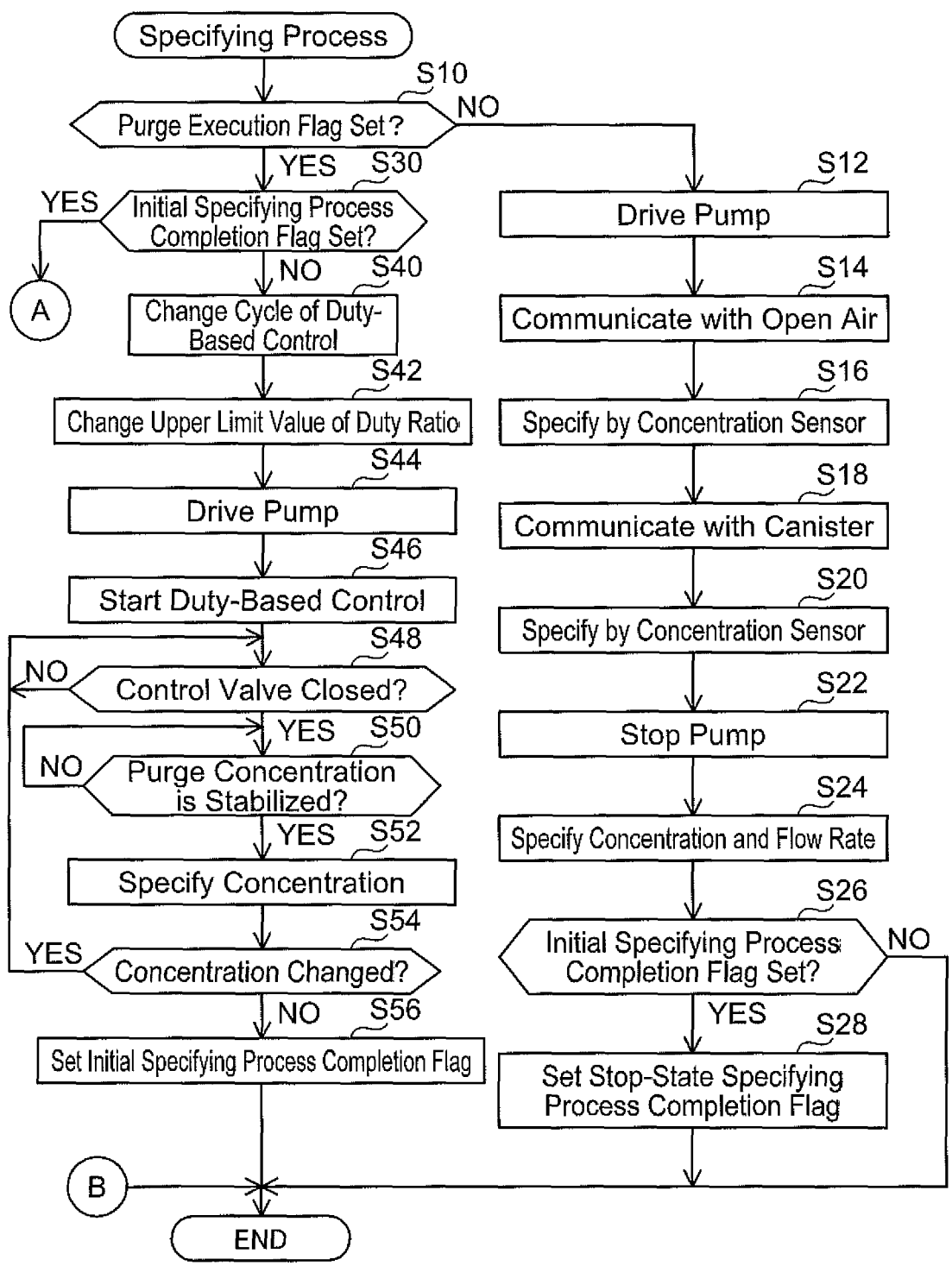
FIG. 4 shows a flowchart of a specifying process according to a first embodiment.

As shown in FIG. 4, in the specifying process, firstly in S10, the ECU 100 determines whether a purge execution flag is set or not. Specifically, the ECU 100 is executing a purge determination process for determining whether the purge condition is satisfied or not in parallel to the specifying process. In the purge determination process, the ECU 100 determines whether the purge condition is satisfied or not based on the cooling water temperature of the engine 2 and the detection result of the air-fuel ratio sensor. The purge condition is set in advance in the ECU 100 in accordance with properties of the vehicle and an environment in which it is used. For example, the ECU 100 determines that the purge condition is satisfied in a case where the cooling water temperature of the engine 2 is equal to or higher than a predetermined value and the detection result of the air-fuel ratio sensor is received. In determining that the purge condition is satisfied, the ECU 100 sets the purge execution flag in the memory.

In a case where the purge execution flag is not set (NO in S10), the ECU 100 proceeds to S12, and the stop-state specifying process of S12 to S24 to be described later are executed. At a timing that is immediately after the vehicle is activated, the purge execution flag is not set, and the stop-state specifying process is executed. The stop-state specifying process calculates a flow rate characteristic of the pump 25, and is executed upon specifying the flow rate of the purge gas passing through the pump 25 when the pump 25 is operating at a predetermined rotary speed. This method is executed under the cutoff state in which the control valve 26 is closed (state in which the purge gas is not introduced into the intake passage 34).

Firstly in S12, the pump 25 is driven at a predetermined rotary speed by a control signal outputted from the ECU 100. Then, in S14, the air communicating valve 54 is switched to the state in which the pump 25 is communicated with open air through the air communicating passage 56 by a control signal outputted from the ECU 100. Due to this, the air is introduced into the communicating passage 23. The air introduced into the communicating passage 23 circulates from the purge passage 22 to the return flow passage 52 by driving the pump 25. At this occasion, in S16, the ECU 100 specifies a differential pressure P0 between both sides of the differential pressure sensor 70 using the concentration sensor 50. In a variant, the ECU 100 may store the differential pressure P0 in the ECU 100 when the processes of S14 and S16 are executed. In a case where the differential pressure P0 is stored in the ECU 100, the ECU 100 may skip the processes of S14 and S16 after the process of S12, and may execute a process of S18. The differential pressure P0 stored in the ECU 100 may be updated regularly or irregularly. After the differential pressure P0 has been specified, in S18, the air communicating passage 56 is switched to the state in which the pump 25 is communicated with the canister 19 by the control signal from the ECU 100. Due to this, the purge gas is introduced into the communicating passage 23. The purge gas circulates from the purge passage 24 to the return flow passage 52. In S20, the ECU 100 specifies a differential pressure P1 between both sides of the differential pressure sensor 70 using the concentration sensor 50. After the differential pressure P1 has been specified, the ECU 100 stops the pump 25 in S22. Then in S24, the ECU 100 calculates the concentration and the flow rate of the purge gas. Specifically, the ECU 100 calculates the density of the purge gas relative to the density of the air by calculating a differential pressure P1/P0 from those specified in S16 and S20. Then, the ECU 100 uses a concentration data map indicating a relationship between the density of the purge gas relative to the density of the air and the purge concentration as stored in advance in ECU 100 to calculate the concentration. This concentration data map is specified in advance by experiments or simulations, and is stored in the ECU 100. Next, the ECU 100 calculates the flow rate by using the density and the differential pressure.

The purge gas is not contained in the open air. That is, the density of the open air is known. Due to this, by specifying the differential pressures P0, P1, the concentration of the purge gas can thereby be specified. Further, as described above, the concentration of the purge gas can be calculated from the Bernoulli formula. Due to this, the flow rates of the gases passing through the concentration sensor can accurately be calculated from the concentrations of the gases (the purge gas and air). The flow rate characteristic of the pump 25 can be obtained by comparing a difference in the flow rates of the purge gas and the air upon when the pump 25 is driven at a predetermined rotary speed, and the purge gas supply quantity during execution of the purge can more accurately be adjusted.

When the process of S24 is completed, the ECU 100 determines in S26 whether an initial specifying process completion flag is set or not. The initial specifying process completion flag is set in S56 when an initial specifying process (processes of S40 to S54) to be described later is completed. In a case where the initial specifying process completion flag is set (YES in S26), the ECU 100 sets a stop-state specifying process completion flag in S28 and terminates the specifying process. On the other hand, in a case where the initial specifying process completion flag is not set (NO in S26), which in other words is a case where an initial purge process has not yet been executed since the vehicle has been activated, the specifying process is terminated by skipping S28.

On the other hand, in a case where the purge execution flag is set in S10 (YES in S10), in other words, in a case where the purge process is being executed, the ECU 100 determines in S30 whether the initial specifying process completion flag is set or not. In a case where the initial specifying process completion flag is not set (NO in S30), in other words, in a case where the initial purge process is executed since when the vehicle has been activated, the ECU 100 proceeds to S40 and executes the initial specifying process of s40 to S54 to be described later.

In S40, the ECU 100 extends a cycle of the duty-based control of the control valve 26 stored in advance (that is, a period of opening and closing the control valve 26 once) only for the cycle of the initial specifying process. For example, in a case where the normal cycle is 60 microseconds (see a period T2 of FIG. 8), it is extended to 120 microseconds (see a period T1 of FIG. 6). Due to this, the period during which the control valve 26 is closed can be elongated without changing the duty ratio. Next, in S42, the ECU 100 reduces an upper limit value of the duty ratio that is stored in advance (for example, 100% (that is, a state where the control valve 26 is normally open)) to a predetermined value (for example, 20%) only for the cycle of the initial specifying process. Due to this, in a case where the duty ratio specified by the ECU 100 exceeds the predetermined value, the duty ratio is set to the predetermined value. As a result, in the initial specifying process, the closed period for the control valve 26 can be avoided from becoming extremely short.

Next, in S44, the pump 25 is driven at the predetermined rotary speed by the control signal outputted from the ECU 100 similar to S12. Next, in S46, the ECU 100 starts the purge process in parallel to the specifying process. In the purge process, the ECU 100 executes the duty-based control on the control valve 26 by the set duty ratio to switch it from the cutoff state to a purge state, and when the purge execution flag is reset, the ECU 100 switches the control valve 26 from the purge state to the cutoff state and terminates the purge process. Then, in S48, the ECU 100 waits until the control valve 26 being controlled on the duty basis is closed. When the control valve 26 is closed (YES in S48), in S50, the ECU 100 repeats the process of calculating the purge concentration similar to S24 by using the concentration sensor 50.

Then, the ECU 100 repeats the concentration calculation until the calculated purge concentration is stabilized, and when the concentration is stabilized (YES in S50), the ECU 100 specifies the stabilized concentration as the purge concentration in S52, and stores the same in the memory. In a variant, the ECU 100 may determine in S50 that the concentration is stabilized after a predetermined period has elapsed since the control valve 26 was closed, calculate the purge concentration using the concentration sensor 50, and proceed to S52. Alternatively, the purge concentration may be specified by using a largest detection value among detection values from the concentration sensor 50 that were repeatedly detected while the control valve 26 was closed. The "largest purge concentration" is a value that obtained by averaging fluctuations caused by detection error in the concentration sensor 50. In a case where the purge concentration decreases as time elapses, the purge concentration may be specified using a smallest detection value among the detection values that were repeatedly detected while the control valve 26 was closed.

As shown in FIG. 6, during when the control valve 26 is controlled on the duty basis and the purge process is being executed, the purge concentration calculated using the concentration sensor 50 changes. In one cycle of the duty-based control (that is, the period T1 between time t1 and t2), the purge gas flows out to the return flow passage 52 when the control valve 26 is switched from being opened to closed. Since a pressure of the purge gas in the return flow passage 52 is not stabilized immediately after the control valve 26 is switched from being opened to closed, so the purge concentration calculated using the concentration sensor 50 changes. In S50, the concentration is repeatedly calculated until the purge concentration calculated using the concentration sensor 50 is stabilized. Due to this, the purge concentration can suitably be specified. According to the initial specifying process, the concentration of the purge gas can be specified at an early stage when the purge process is started. Due to this, the fuel quantity to be supplied to the engine 2 can be adjusted to a suitable quantity at an early stage.

Next, as shown in FIG. 4, a determination is made in S54 on whether or not the concentration stored in S52 has changed from the concentration that was stored in previously executed S52. As shown in FIG. 6, during the initial specifying process, the gas remaining in the purge passage 22 after the purge process is not executed for a relatively long time period is supplied immediately after the purge process has been started. Due to this, in the purge process, the purge concentration becomes gradually higher at a beginning, and stabilizes thereafter. In S54, a determination is made on whether or not the purge concentration during a purge process period has been stabilized. In a case where the concentration is changing (YES in S54), the ECU 100 returns to S48 and specifies the concentration again. On the other hand, in a case where the concentration is not changing (NO in S54), the ECU 100 sets the initial specifying process completion flag in S56 and terminates the process. Instead of the above process, the ECU 100 may determine in S54 whether or not the purge concentration has stabilized based on a supply quantity of the purge gas into the intake passage 34 in the purge process. For the supply quantity of the purge gas, the supply quantity of the purge gas may be specified by disposing a flow rate sensor on the purge passage 22, for example, or alternatively a total value thereof during the opened period for the control valve 26 during the purge process may be used, or a total value of a purge rate (purge flow rate/flow rate supplied from the intake passage 34 to the engine 2) may be used. The duty ratio cycle and the upper limit changed in S40, S42 are reset, and the specifying process is thereafter terminated.

Figure 5:
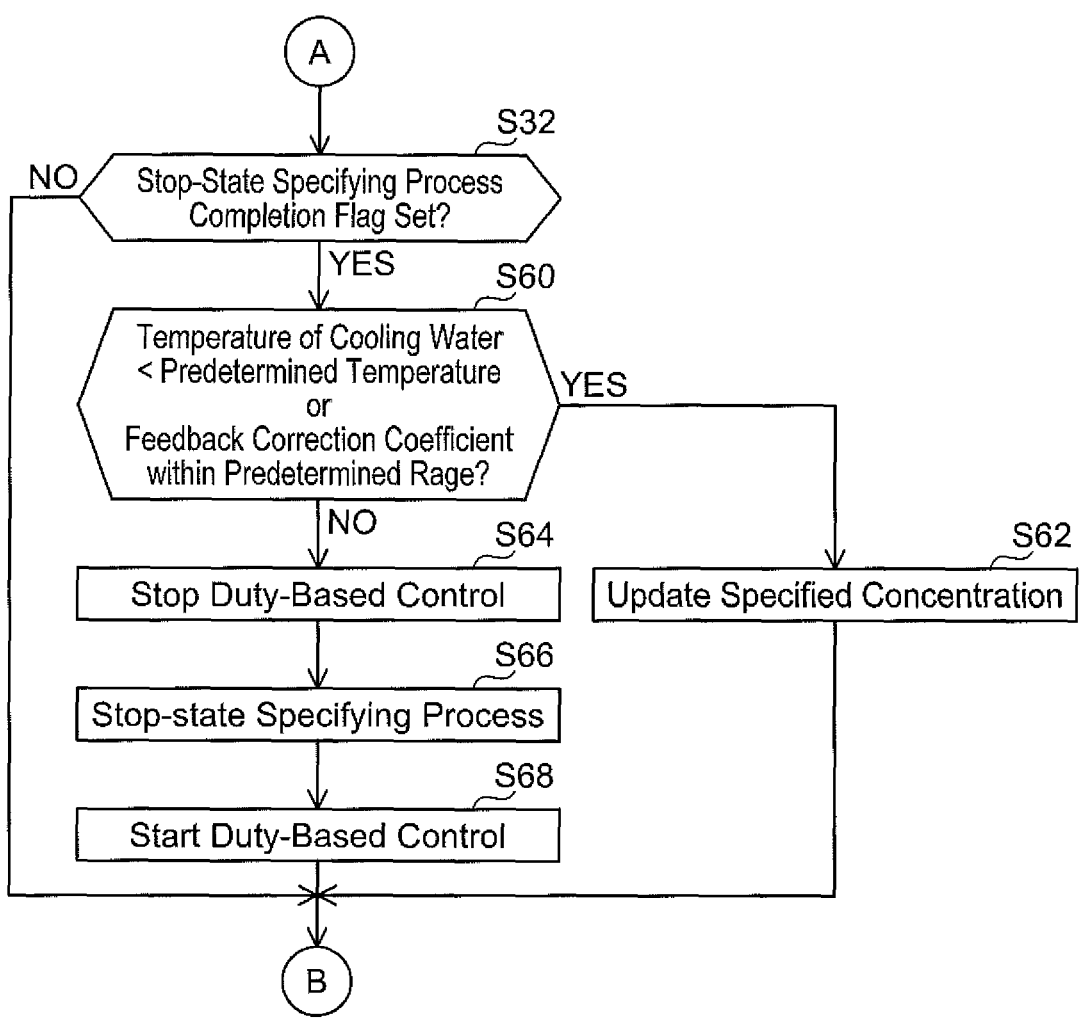
FIG. 5 shows a flowchart of the specifying process according to the first embodiment in continuation from FIG. 4.

On the other hand, in a case where the initial specifying process completion flag is set (YES in S30), in other words, in a case where the second or subsequent purge process since the vehicle has been activated is being executed, the ECU 100 proceeds to S32 of FIG. 5. In S32, the ECU 100 determines whether or not the stop-state specifying process completion flag is set. In a case where the stop-state specifying process completion flag is not set (NO in S32), the specifying process is terminated. On the other hand, in a case where the stop-state specifying process completion flag is set (YES in S32), the ECU 100 proceeds to S60 and a normal specifying process of S60 to S68 to be described later is executed. In S60, the ECU 100 determines whether or not the temperature of the cooling water for the engine 2 is lower than a predetermined value (for example, 60° C.), or whether or not the feedback correction coefficient is within a predetermined range. An absolute value of the feedback correction coefficient becomes larger when a displacement of the air-fuel ratio is larger. A case where the feedback correction coefficient is outside the predetermined range (for example, 1.0±5%) is a case where the displacement of the air-fuel ratio is being large. In a case where the water temperature is lower than the predetermined value or a case where the feedback correction coefficient is within the predetermined range (YES in S60), the ECU 100 updates the stored purge concentration to the purge concentration that is obtained using the feedback correction coefficient in S62 and terminates the specifying process.

In S62, specifically, the purge concentration is updated by adding or subtracting a preset variation value to the stored purge concentration in accordance with the variation in the feedback correction coefficient and the air-fuel ratio. That is, in a case where the variation in the feedback correction coefficient is relatively small, the stored purge concentration is not changed. On the other hand, in a case where the feedback correction coefficient is increasing and the air-fuel ratio is in the lean state, that is, in being determined as that the air-fuel ratio is maintained in the lean state, the purge concentration is updated by subtracting the preset variation value from the stored purge concentration. Due to this, the purge concentration can be specified as a low value. By specifying the purge concentration as the low value, the injection time period becomes long, and the air-fuel ratio changes toward the rich side. Further, in a case where the feedback correction coefficient is decreasing and the air-fuel ratio is in the rich state, that is, in being determined as that the air-fuel ratio is maintained in the rich state, the purge concentration is updated by adding the preset variation value to the stored purge concentration. Due to this, the purge concentration can be specified as a high value. By specifying the purge concentration as the high value, the injection time period becomes short, and the air-fuel ratio changes toward the lean side. Due to this, the air-fuel ratio can be brought closer to the target air-fuel ratio. According to this configuration, in the normal specifying process, the concentration of the purge gas does not have to be specified at the timing of closing the control valve 26 during when the purge process is being executed.

On the other hand, in a case where the water temperature is equal to or higher than the predetermined value and the feedback correction coefficient is outside the predetermined range (NO in S60), the ECU 100 stops the duty-based control of the control valve 26 for a predetermined period in S64 even in the case where the purge execution flag is set. Due to this, the purge process is temporarily stopped. When the engine 2 is activated, a temperature of the engine rises. When the temperature of the engine 2 rises, a temperature of the purge gas in the purge passage 22 also rises, and the purge concentration increases. Especially when the temperature of the purge gas exceeds a reference value, the purge concentration changes drastically, and there are cases where the change in the purge concentration cannot be followed by a mere feedback by the air-fuel ratio sensor. Further, in the case where the feedback correction coefficient is outside the predetermined range, the purge concentration is high and there are cases where the change in the purge concentration cannot be followed by the mere feedback by the air-fuel ratio sensor. In such cases, the purge concentration obtained from the feedback by the air-fuel ratio sensor is used to decide the injection quantity to prevent the air-fuel ratio from exhibiting a significant disturbance. The feedback correction coefficient calculation process is executed in parallel to the processes of S64 to S68.

Next, in S66, the ECU 100 executes a stop-state specifying process similar to S12 to S24 of FIG. 4. S12 is skipped in a case where the pump 25 is already driving. Further, in S24, the ECU 100 does not calculate the flow rate but calculates only the purge concentration. Then, in S68, the ECU 100 starts the duty-based control that was temporarily stopped in S64. When the purge process is restarted in S68, a new specifying process is started. As a result, when YES is determined in subsequent S60, the concentration calculated in S66 can be corrected using the feedback correction coefficient. Due to this, the feedback correction can suitably be executed even in the case where the purge concentration changes drastically.

In the above evaporated fuel processing device 20, the concentration sensor 50 is not disposed on the purge passage 22. Due to this, the purge gas can be prevented from losing its pressure by the concentration sensor 50. Further, by specifying the purge concentration at a timing during the purge process when the control valve 26 is closed, the purge concentration can suitably be specified during the purge process.

Second Embodiment

Figure 7:
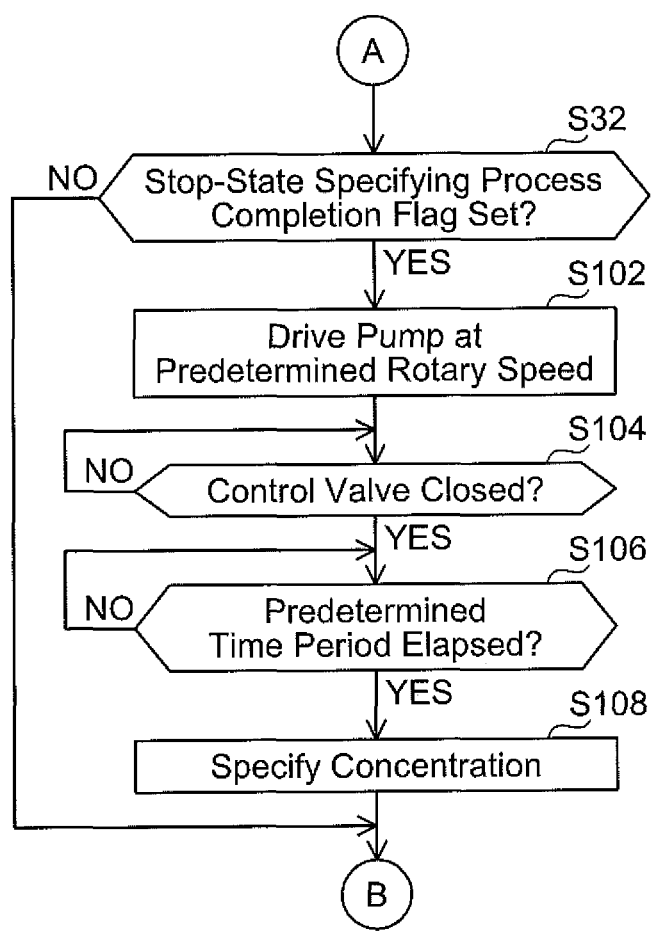
FIG. 7 shows a part of a flowchart of a specifying process according to a second embodiment.

Points that differ from those of the first embodiment will be described with reference to FIGS. 7 and 8. In a second embodiment, a normal specifying process differs from the normal specifying process of the first embodiment. Specifically, in the normal specifying process of the second embodiment, the concentration is specified during when the control valve 26 is closed, similar to the initial specifying process. In a specifying process of the second embodiment, the processes of S60 to S68 in the specifying process of the first embodiment (FIGS. 4 and 5) are replaced with processes of S102 to S108 shown in FIG. 7.

In the case where the stop-state specifying process completion flag is set (YES in S32), the ECU 100 drives the pump 25 at a predetermined rotary speed in S102. In the case where the pump 25 is already driving, S102 is skipped. Then, in S104, the ECU 100 waits until the control valve 26 is closed, similar to S48 of FIG. 4. When the control valve 26 is closed (YES in S104), the ECU 100 waits until a predetermined time period has elapsed since the control valve 26 was closed (YES in S106), after which it specifies the concentration in S108 using the concentration sensor 50, and stores the same in the ECU 100. By waiting until the predetermined time period has elapsed since the control valve 26 was closed, the purge concentration can be specified after the purge concentration has been stabilized. According to this configuration, the concentration of the purge gas can be specified each time the purge process is executed. The processes of S32 to S108 are executed repeatedly during when the control valve 26 is driving, each time the control valve 26 is driven.

Figure 8:
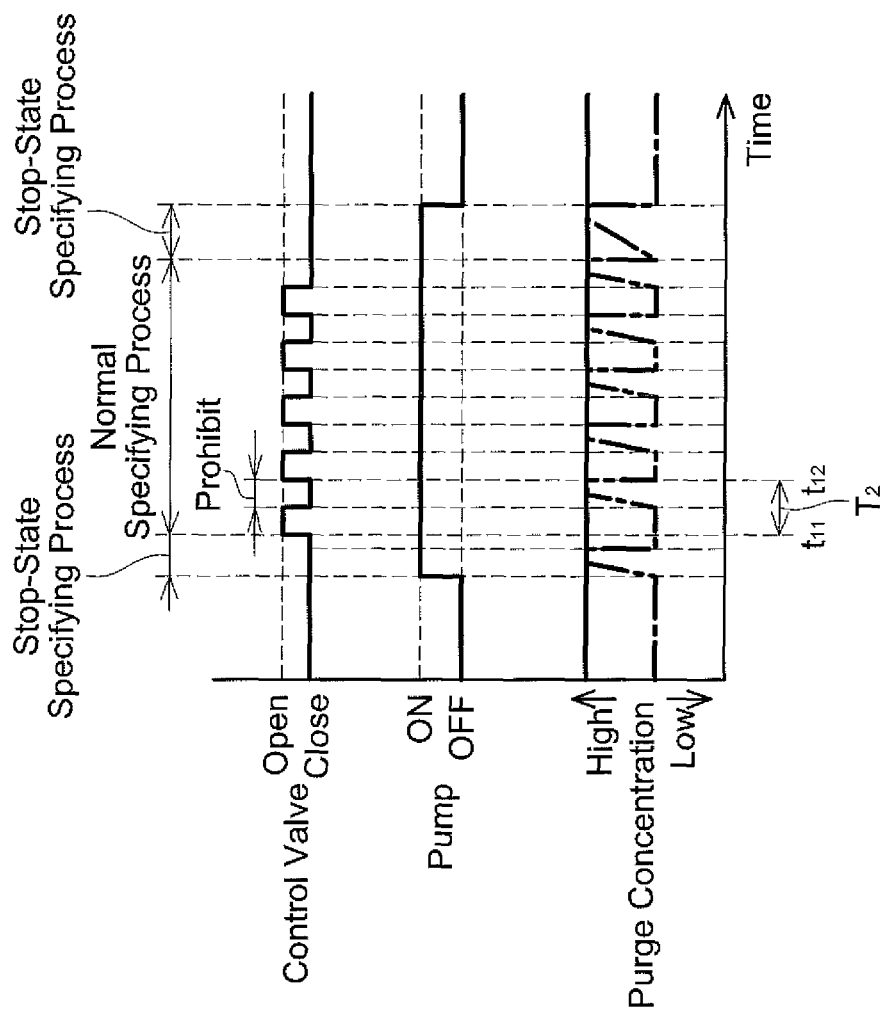
FIG. 8 shows a time chart indicating changes in opening and closing of a control valve and a purge concentration according to the second embodiment.

As shown in FIG. 8, unlike the initial specifying process, the normal specifying process does not extend the cycle T2 of the duty-based control (see S40 of FIG. 4) and does not decrease the upper limit of the duty ratio (see S42 of FIG. 4). On the other hand, it sets the period during which the control valve 26 is closed to be equal to or greater than a predetermined period and prohibits the control valve 26 from opening. The predetermined period is a period during which the purge concentration can be detected by the concentration sensor 50, is specified in advance by experiments, and is stored in the ECU 100. That is, in a case where the closing period of the control valve 26 is shorter than the predetermined period in a calculated duty ratio, the ECU 100 does not open the control valve 26 until the predetermined period has elapsed since it was closed.

Third Embodiment

Figure 9:
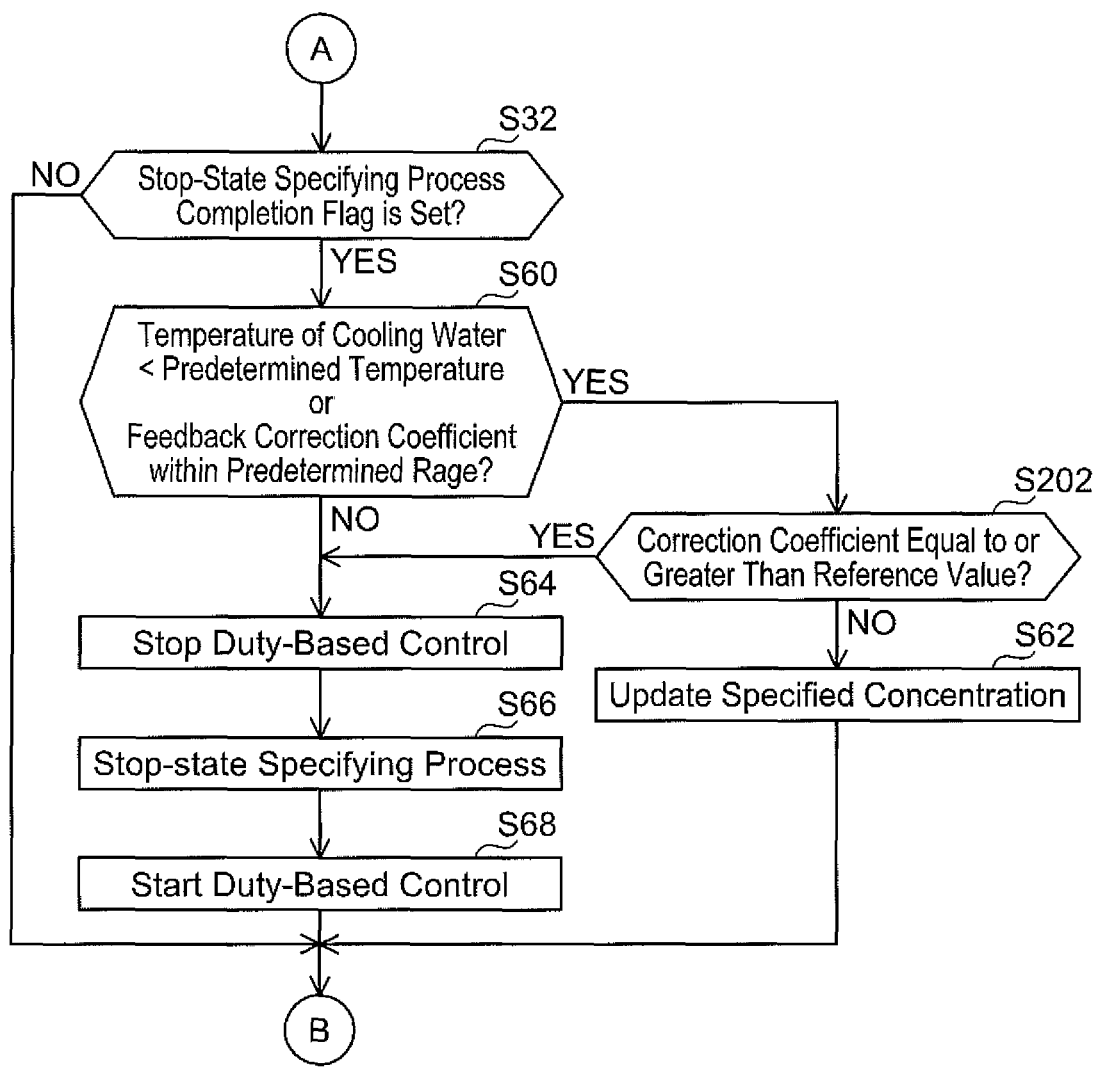
FIG. 9 shows a part of a flowchart of a specifying process according to a third embodiment.

Points that differ from those of the first embodiment will be described. In a third embodiment, a normal specifying process differs from the normal specifying process of the first embodiment. Specifically, in the normal specifying process of the third embodiment, in the case where the feedback correction coefficient is large, the duty-based control is temporarily stopped and the purge concentration is re-specified. As shown in FIG. 9, in the normal specifying process, in the case where the water temperature of the cooling water is less than the predetermined value or the case where the feedback correction coefficient is within the predetermined range (YES in S60), the ECU 100 determines in S202 whether the current feedback correction coefficient is equal to or greater than a reference value. In a case of being equal to or greater than the reference value (YES in S202), the ECU 100 proceeds to S64 and temporarily stops the duty-based control. On the other hand, in a case of being less than the reference value (NO in S202), the ECU 100 proceeds to S62.

For example, when the vehicle shakes at a great magnitude or is exposed to high temperature, the purge gas is abruptly generated and the purge concentration becomes abruptly high. According to this configuration, in the situation where a large change in the feedback correction coefficient and a large change in the purge concentration are assumed, the duty-based control can temporarily be stopped. Due to this, a situation where the suitable air-fuel ratio cannot be maintained in the engine 2 can be avoided. Further, a more accurate purge concentration can be specified using the concentration sensor 50.

As above, the embodiments of the present invention have been described, however, these are merely examples, and do not intend to limit the scope of claims. The techniques described in the scope of claims include various alterations and variants of the embodiments described above.

For example, in the above embodiments, the differential pressure sensor 70 that specifies the differential pressure is used as the concentration sensor 50. However, the concentration sensor 50 may include an ultrasonic concentration meter. The ultrasonic concentration meter may have a cylinder shape disposed on the return flow passage 52, and may specify the concentration of the purge gas (that is, a molecular weight of the purge gas) by sending and receiving signal into and from within the cylinder shape.

Further, in the first and second embodiments as above have different normal specifying processes. However, the evaporated fuel processing device 20 may co-use the normal specifying process of the first embodiment and the normal specifying process of the second embodiment. Specifically, the normal specifying process of the first embodiment may be executed in the case of not using the pump 25 in the purge process, that is, in the case of supplying the purge gas by the negative pressure generated by the engine 2 to specify the purge concentration, and the normal specifying process of the second embodiment may be executed in the case of using the pump 25 in the purge process to specify the purge concentration. According to this configuration, the pump 25 does not have to be driven for specifying the concentration in the purge process that does not require the pump 25.

Figure 10:
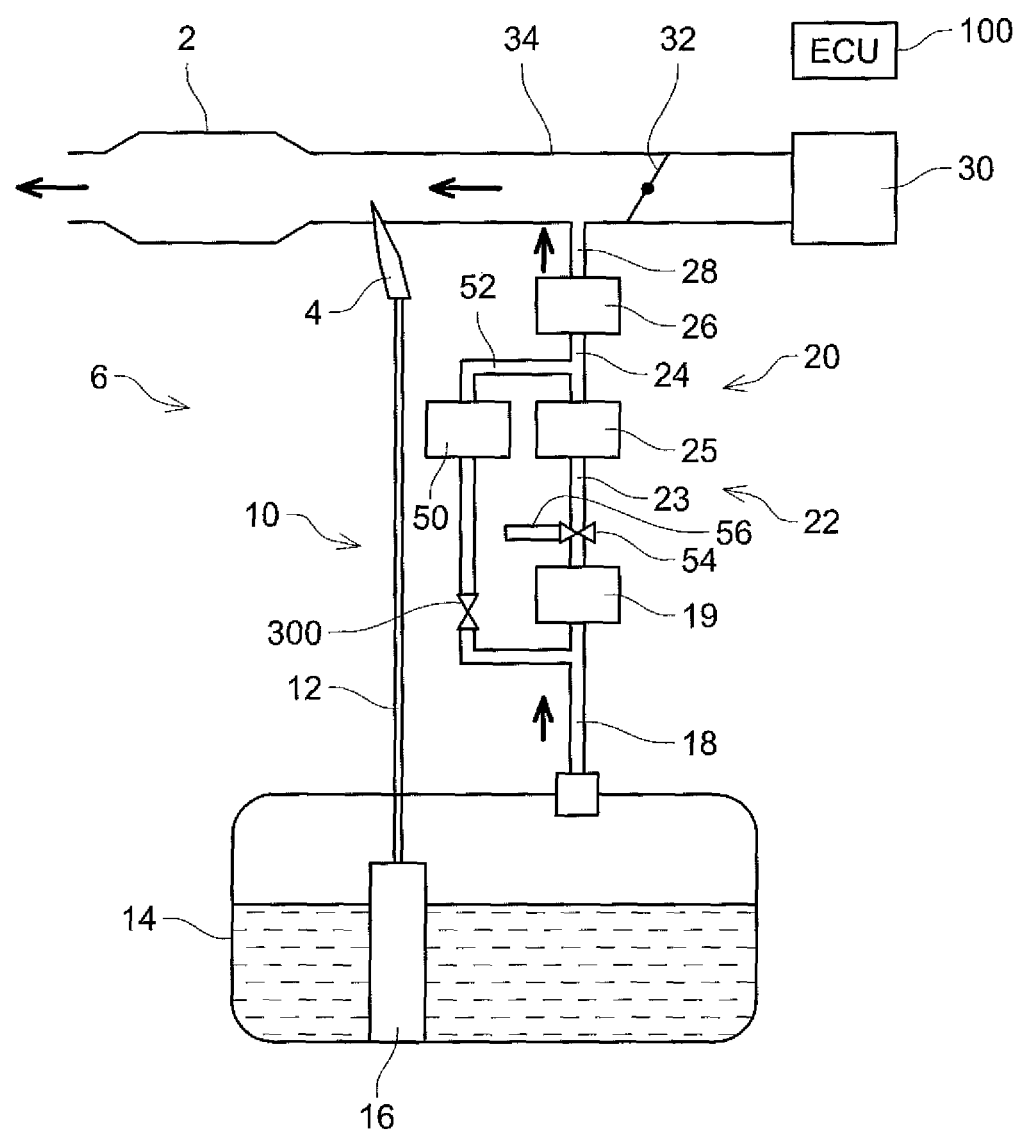
FIG. 10 shows an overview of a fuel supply system of a vehicle according to a variant.

Further, in the above evaporated fuel processing device 20, the downstream end of the return flow passage 52 is connected to the communicating passage 24 between the canister 19 and the pump 25. However, as shown in FIG. 10, the downstream end of the return flow passage 52 may be connected between the fuel tank 14 and the canister 19.

In this variant, a cutoff valve 300 may be disposed on the return flow passage 52 on the downstream side of the concentration sensor 50. The cutoff valve 300 may be a check valve that allows the purge gas to flow downstream from the concentration sensor 50 and prohibits it to flow from the downstream end of the return flow passage 52 toward the concentration sensor 50. Alternatively, it may be a switch valve that switches between opened and closed states to switch between a state of closing the return flow passage 52 and a state of opening the return flow passage 52.

Figure 11:
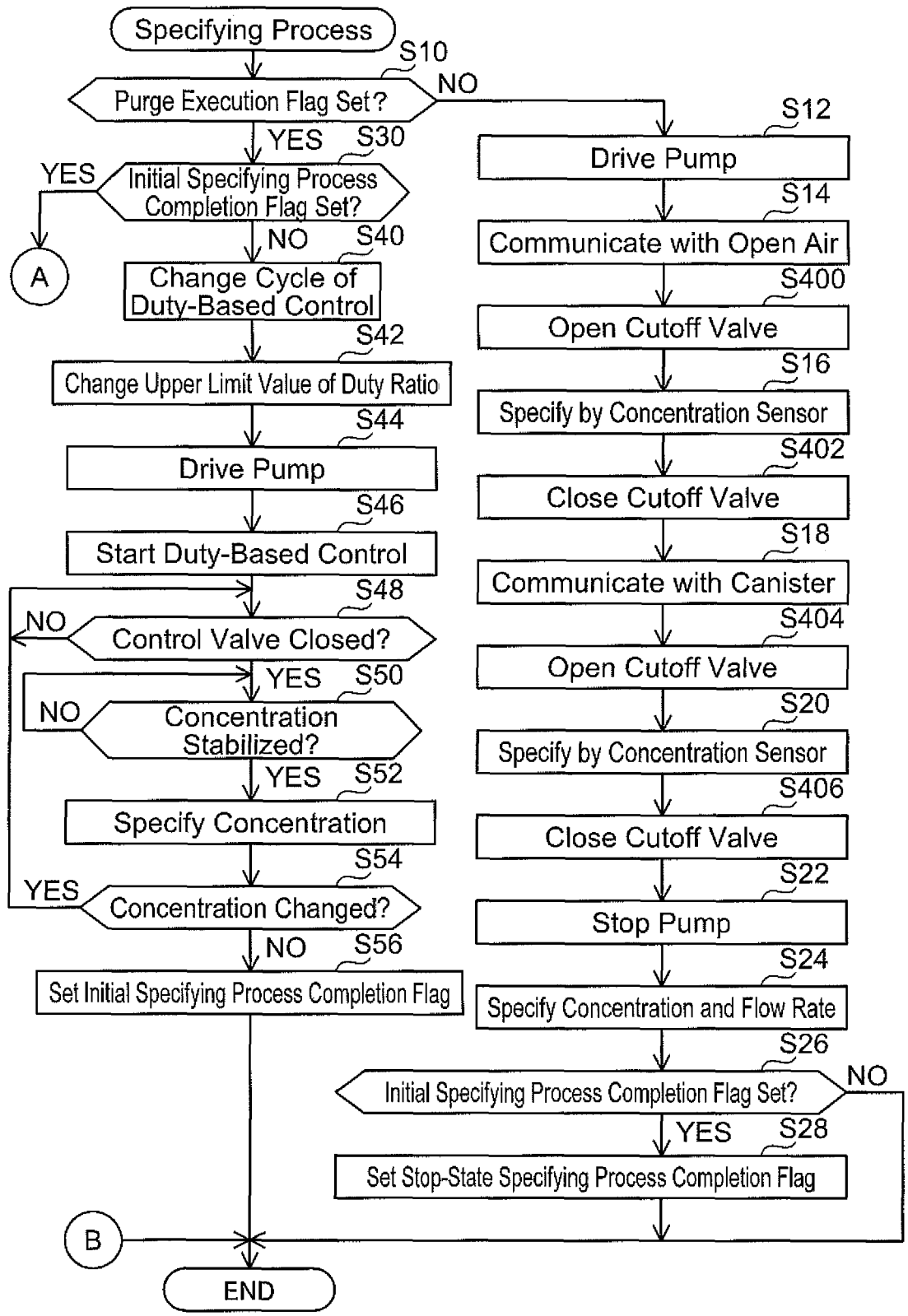
FIG. 11 shows a part of a flowchart of a specifying process according to the variant.

In the case where the cutoff valve 300 is the switch valve, its switching may be controlled by the ECU 100. In this case, as shown in FIG. 11, in the stop-state specifying process, after the air communicating valve 54 is switched so that the pump 25 is communicated with open air through the communicating passage 56 in S14, the ECU 100 may switch the cutoff valve 300 in S400 from the state of closing the return flow passage 52 to the state of opening the return flow passage 52. Then, after a predetermined period since the process of S400 was executed (that is, a period sufficient for the air to fill within the return flow passage 52), the process of S16 is executed, and then in S402, the ECU 100 may switch the cutoff valve 300 from the state of opening the return flow passage 52 to the state of closing the return flow passage 52. Similarly, after the air communicating valve 54 is switched to the state in which the pump 25 is communicated with the canister 19 in S18, the ECU 100 may switch the cutoff valve 300 in S404 from the state of closing the return flow passage 52 to the state of opening the return flow passage 52, and after a predetermined period (that is, a period sufficient for the purge gas to fill within the return flow passage 52) has elapsed, the process of S20 may be executed, and the ECU 100 may switch the cutoff valve 300 in S406 from the state of opening the return flow passage 52 to the state of closing the return flow passage 52. According to this configuration, the gas in the return flow passage 52 can suitably be replaced while the purge process is not being executed.

In the respective embodiments as above, the concentration sensor 50 includes the differential pressure sensor 70. However, in a case of being provided with an orifice passage, the concentration sensor 50 may be provided with a pressure sensor that measures pressures on upstream and downstream sides on the orifice passage instead of the differential pressure sensor 70. The downstream side of the orifice passage is communicated with open air, so it is maintained at an air pressure. Due to this, the differential pressure can be calculated by measuring the pressure on the upstream side of the orifice passage.

In the respective embodiments as above, the evaporated fuel processing device 20 is provided with the air communicating valve 54 and the air communicating passage 56. However, the evaporated fuel processing device 20 may not be provided with the air communicating valve 54 and the air communicating passage 56. In this case, in the process of FIG. 4, the ECU 100 does not have to execute the processes of S14 to S18.

Further, the technical features described in the description and the drawings may technically be useful alone or in various combinations, and are not limited to the combinations as originally claimed. Further, the technique described in the description and the drawings may concurrently achieve a plurality of aims, and technical significance thereof resides in achieving any one of such aims.

DESCRIPTION OF REFERENCE NUMBERS

2: Engine
3: Fuel Tank
4: Injector
6: Fuel Supply System
10: Main Supply Passage
12: Supply Passage
14: Fuel Tank
16: Fuel Pump Unit
18, 23, 24, 28: Communicating Passage
19: Canister
20: Evaporated Fuel Processing Device
22: Purge Passage
25: Pump
32: Throttle Valve
34: Intake Passage
50: Concentration Sensor
52: Return Flow Passage
54: Air Communicating Valve
56: Air Communicating Passage
70: Differential Pressure Sensor
72: Venturi Passage
100: ECU

The invention claimed is:

1. An evaporated fuel processing device mounted on a vehicle, the evaporated fuel processing device comprising:
a canister configured to adsorb fuel evaporated in a fuel tank;
a purge passage connected between the canister and an intake passage of an engine, and through which a purge gas sent from the canister to the intake passage passes;
a pump disposed on the purge passage between the canister and the intake passage and configured to send the purge gas from the canister to the intake passage;
a control valve disposed on the purge passage and configured to switch between a communication state and a cutoff state, the communication state being a state where the canister and the intake passage communicate through the purge passage, and the cutoff state being a state where the canister and the intake passage are cut off on the purge passage;
a controller configured to control the communication state and the cutoff state of the control valve based on a duty ratio by switching the control valve between the communication state and the cutoff state in a case of supplying the purge gas from the canister to the intake passage;
a return flow passage, one end of the return flow passage connected to the purge passage between the pump and the control valve, and other end of the return flow passage connected to an upstream side of the pump, wherein the purge gas flows from the one end to the other end in a case where the pump is activated in the cutoff state of the control valve; and
a detecting device configured to specify an evaporated fuel concentration of the purge gas in the return flow passage,
wherein
the detecting device specifies the evaporated fuel concentration of the purge gas in the return flow passage during the cutoff state of the control valve in a case where the control valve is controlled based on the duty ratio and the pump is activated.

2. The evaporated fuel processing device as in claim 1, wherein
the detecting device is configured to specify the evaporated fuel concentration of the purge gas in the return flow passage during the cutoff state of the control valve and at a timing when the pump is activated for a first time after activation of the vehicle and when the control valve is controlled based on the duty ratio.

3. The evaporated fuel processing device as in claim 1, wherein
the detecting device is configured to specify the evaporated fuel concentration of the purge gas in the return flow passage during the cutoff state of the control valve each time the pump is activated and the control valve is controlled based on the duty ratio.

4. The evaporated fuel processing device as in claim 1, wherein
the vehicle is configured to decide a correction value for feedback correction of a fuel injection quantity injected to the engine based on a detection result by a sensor specifying an air-fuel ratio in an exhaust passage through which an exhaust gas from the engine flows, while the control valve is controlled based on the duty ratio, and
the evaporated fuel processing device further comprises a specifying device configured to specify the evaporated fuel concentration of the purge gas supplied from the purge passage to the intake passage based on the correction value.

5. The evaporated fuel processing device as in claim 2, wherein
the vehicle is configured to decide a correction value for feedback correction of a fuel injection quantity injected to the engine based on a detection result by a sensor specifying an air-fuel ratio in an exhaust passage through which an exhaust gas from the engine flows, while the control valve is controlled based on the duty ratio after the timing when the pump is activated for the first time after activation of the vehicle and when the control valve is controlled based on the duty ratio, and
the evaporated fuel processing device further comprises a specifying device configured to specify the evaporated fuel concentration of the purge gas supplied from the purge passage to the intake passage based on the correction value.

6. The evaporated fuel processing device as in claim 4, wherein the controller is configured to shift the control valve from a state where the control valve is controlled based on the duty ratio to the cutoff state in a case where the correction value exceeds a reference value while the control valve is controlled based on the duty ratio, and the detecting device is configured to specify the evaporated fuel concentration of the purge gas in the return flow passage in a case where the pump is activated after the control valve has shifted to the cutoff state.

7. The evaporated fuel processing device as in claim 1, wherein the controller is configured to elongate an activation cycle of the control valve in a case where the detecting device is to specify the evaporated fuel concentration.

8. The evaporated fuel processing device as in claim 7, wherein the detecting device is configured to specify the evaporated fuel concentration of the purge gas in the return flow passage during when the activation cycle is elongated and the control valve is in the cutoff state.

9. The evaporated fuel processing device as in claim 1, wherein the controller is configured to limit the duty ratio to a reference duty ratio or lower in a case where the detecting device is to specify the evaporated fuel concentration.

10. The evaporated fuel processing device as in claim 1, wherein the detecting device is configured to specify the evaporated fuel concentration by using a detection result obtained after a period in which the control valve is in the cutoff state exceeds a predetermined reference period or a stable detection result detected during the cutoff state of the control valve.

11. The evaporated fuel processing device as in claim 1, wherein the detecting device is configured to specify the evaporated fuel concentration by using one of a maximum detection result and a minimum detection result that is obtained later than the other, the maximum detection result and the minimum detection result being detected during the cutoff state of the control valve.

* * * * *